Feb. 13, 1934.　　　　C. T. BARD　　　　1,947,371
GAS METER BAR
Filed Dec. 8, 1931
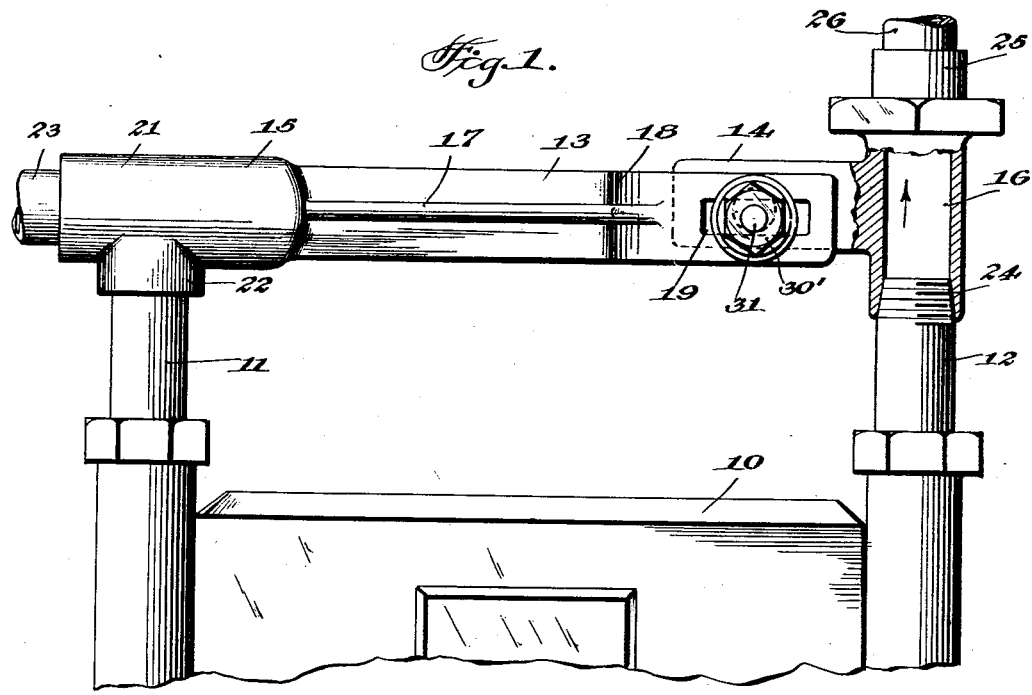
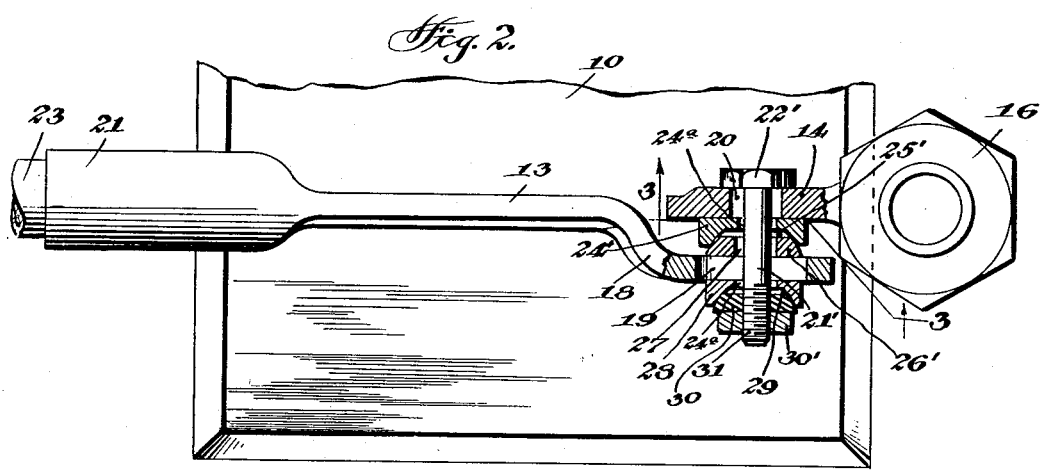
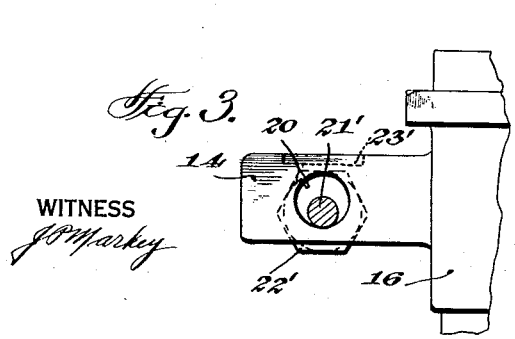
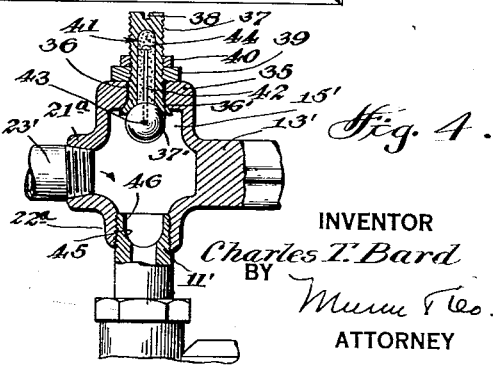
WITNESS
J. P. Markey
INVENTOR
Charles T. Bard
BY
Munn & Co.
ATTORNEY Patented Feb. 13, 1934

1,947,371

UNITED STATES PATENT OFFICE 1,947,371

GAS METER BAR

Charles Tyler Bard, Norwich, Conn.

Application December 8, 1931. Serial No. 579,805

3 Claims. (Cl. 285—3)

My invention relates to a meter connection and support and is especially useful in association with gas meters and it consists in the constructions, arrangements and combinations herein described and claimed.

As is well known, the inlet and outlet connections of gas meters are not accurately positioned, nor are they in the same plane, with a result that great difficulty has been encountered heretofore, in effecting connection between the street, house pipes and meter, and in many cases the meter and the pipes are distorted, resulting in leakage of gas.

It is therefore an important object of my invention to provide a combined meter connection and support which may be readily attached to the inlet and outlet connections of a meter and which will permit of vertical as well as lateral adjustments to meet the various irregularities in the position of the pipes to be connected.

It is a further object of the invention to provide a meter support in which a ball socket joint is incorporated, providing means for readily oscillating the bar so as to properly position the connecting fittings for securement to the inlet and outlet of a gas meter, as well as to include means for positively locking said joint in an adjusted position.

It is a still further object of the invention to provide a meter connection and support embodying an inlet and outlet fitting, the inlet fitting having an automatic valve operable to shut off the gas, in the event of fire or development of excessive heat adjacent the meter.

Additional objects, advantages and features of invention will be apparent from the following description and accompanying drawing, wherein:

Figure 1 is a side elevation of my meter connection and support in position upon a meter, only the upper portion of the meter being illustrated.

Fig. 2 is a top plan view thereof, the ball socket joint being illustrated in section;

Fig. 3 is a section on the line 3—3 of Fig. 2;

Fig. 4 is a vertical sectional view of the inlet end of a further form of support, illustrating the automatic shut-off valve.

In the drawing, the gas meter is indicated generally by the reference character 10, having inlet and outlet pipes 11 and 12 respectively. The meter connection includes bars 13 and 14, the bar 13 being formed integrally with the fitting 15, and the bar 14 is formed as an integral part of the fitting 16. The bar 13 has a longitudinal rib 17, affording strength to the bar, and the free end of this bar is offset, as at 18, to permit of overlapping of the bar 14, as clearly shown in Fig. 2. It should be noted that the bar 14 is of less length than the bar 13, and in fact, is of a length to be received within the off-set portion of the bar 13.

The bar 13 has a slot 19 extending longitudinally thereof, and the bar 14 has a circular hole 20, the slot and hole being in registry for accommodation of a fastening means presently to be described.

The fitting 15 is in the form of an L-shaped casting having internally threaded portions 21 and 22. A service line 23 is screwed into the portion 21 and the pipe 11 of the meter is screwed into the portion 22. The fitting 16 is illustrated as a straight connecting nipple having a threaded portion 24 receiving the pipe 12 of the meter, the opposite end 25 being similarly threaded for connection of the service line 26. While I have shown and described certain styles of fittings, it should be understood that I do not confine myself to any particular shape, since these will vary according to meter constructions as well as certain pipe layouts encountered in installation.

Attention is now directed to Fig. 2 of the drawing for a full understanding of the securement of the bars 13 and 14 at their overlapped ends. A bolt 21' is inserted through the opening 20 of the bar 14 from one side thereof, the head 22' thereof engaging a rib 23' extending longitudinally of the bar 14, to prevent rotation of the bolt during the tightening action, as will be apparent. (See Fig. 3.) Upon the opposite side of the bar 14 there is a plate 24' having an aperture 24a of a size to loosely receive the bolt 21', and this plate also includes a spherically ground socket 25' within which a ball member 26' is rockably seated. The bolt 21' passes through the aperture 27 of the ball member and through the slot 19 of the bar 13, after which a plate 28 identical in construction to the plate 24' recessed as at 29 to receive the ball member 30 is positioned upon the bolt. The ball member 30 is identical in construction to the ball member 26'. The ball and socket members assembled upon the bolt as described are secured by a nut 30' engaged upon the threaded portion 31 of the bolt. The apertures 20 and 24a and 27 are of a diameter considerably greater than the diameter of the bolt 21 and the slot 19 is likewise wider than the diameter of the bolt.

From the foregoing it will be apparent that the fittings 15 and 16 may be separately affixed to respective pipes 11 and 12, with their bars 13 and 14 overlying the meter 10. As shown in Fig. 1 it is not necessary that the bars 13 and 14 be in alignment, since the apertures 20, 24a and 27, and slot 19 are of such width as to accommodate the bolt 21 in various positions and it will be further understood that provision of the ball and socket members permit the bars 13 and 14 to assume angular relationships to one another, without sacrificing strength of the bars 13 and 14, nor exerting strains upon the fittings 15 and 16, upon tightening of the nut 30' to secure the bars together.

In Fig. 4, I have shown a modification of the inlet fitting 15 in which provision is made for an automatic shut-off valve operable in case of fire or development of heat otherwise. In this form, the bar 13' is formed integrally with the fitting as above described, and likewise includes the threaded portion 21a for connection of the gas main, as well as the threaded portion 22a for connection to the meter pipe 11'. In the upper wall 35 of the fitting, I provide an aperture 36 into which a plug 37 is secured. The aperture 36 is formed with a conical seat 36' and the plug 37 is provided with a conical portion 37' adapted to engage within the seat 36'. The plug 37 is of a length to project beyond the wall 35 and is threaded to receive lock nuts 39 and 40. The securement of the plug 37 in the wall 35 is substantially as follows. The plug 37 is inserted in the aperture 36 so that the portion 37' will engage within the conical seat 36' and the nut 39 screwed down upon the plug so as to engage the outer portion of the wall 35. The plug 37 may be retained against turning movements by insertion of a screw driver within the kerf 38. A final tightening of the nut 39 will draw the conical portion 37' snugly within the seat 36' thus preventing leakage of gas, and the lock nut 40 may then be engaged upon the plug 37 to lock the parts in this position.

The plug 37 has a central elongated chamber 41 adapted to receive a stem 42 of a valve 43. The stem 42 has a head 44 at the end opposite the valve 43, and normally the stem and head are disposed centrally within a body of hardened wax solution confined within the chamber 41, thereby supporting the valve directly over the opening of the pipe 11'. The opening in the pipe 11' is suitably formed to provide a valve seat 45. Normally the valve 43 is maintained in suspended position above the valve seat 45 and gas will enter by way of the pipe 23' and pass to the pipe 11'. In the event of fire or the development of heat adjacent the fitting 15', the wax solution will become melted, releasing the stem 42. Thus, the valve will fall to its seat 45, snugly seating therein, effectively closing the pipe 11' to further passage of gas therethrough.

It should be noted that the valve seat 45 is of considerable length and almost encloses the valve when seated therein and further when the valve is seated provides an annular groove 46. This groove functions to catch and retain the melted wax to positively seal the valve within its seat.

While I have described the modified form of valve as embodied in a meter bar, it will be apparent that the valves may be incorporated in any usual pipe line.

From the foregoing it will be seen that I have provided a meter support having all the advantages of a one-piece supporting bar, insofar as strength and rigidity are concerned, but in addition, it will be noted that by the provision of ball and socket joints, I have provided a support which will accommodate meter connections regardless of their variations from true or proper alignments, as well as taking care of meters of various lengths and heights, these adjustments being effected by means of the single adjusting and locking device.

While I have shown and described specific embodiments of the invention it should be understood that I do not confine myself thereto, and reserve as my own, all such modifications as fairly fall within the scope of the appended claims.

I claim:

1. In a device of the class described, fittings adapted for attachment to the inlet and outlet pipes of a meter, integral opposed extensions on said fittings, one of said extensions having an offset portion to receive the extension of said other fittings and having a single elongated slot, said other extension having a circular aperture arranged to register with the slot, a ball and socket member interposed between said extensions, a bolt extended through the aperture and slot of said extensions and through said ball and socket members, a second socket member carried by said bolt and contacting one of said extensions, and a ball member in loose engagement with said bolt for seating engagement within said last named socket member.

2. In a device of the class described, fittings adapted for attachment to the inlet and outlet pipes of a meter, integral opposed extensions on said fittings, one of said extensions having an offset portion to receive the extension of said other fitting and having a single elongated slot, said other extension having a single circular aperture arranged to register with said slot, a ball and socket member interposed between said extensions, a bolt extending through the aperture and slot of said extensions through said ball and socket members, a second socket member carried by said bolt and contacting one of said extensions, and a ball member in loose engagement with said bolt for seating engagement within the last named socket member.

3. In a device of the class described, fittings adapted for attachment to the inlet and outlet pipes of a meter, integral opposed extensions on said fittings, one of said extensions being relatively short, the other of said extensions being relatively long and having an offset portion to overlie the other fitting, one of said extensions having a single circular opening, the other of said extensions having a single elongated slot arranged to register with said opening, a bolt having a shank of smaller diameter than the circular opening and the slot, a socket member having a central opening, said socket member being arranged to engage one of said extensions, a ball member fitting into said socket member, said ball and socket member having central openings to receive said bolt, a second ball and socket member, said last named socket member having an opening to receive the bolt and being in engagement with one of said extensions, a ball member loose on the stem of the bolt and arranged to engage said last named socket, and a nut on the end of the bolt for clamping the extensions and the ball and socket members together.

CHARLES TYLER BARD.